(12) United States Patent
Faers et al.

(10) Patent No.: US 12,097,960 B2
(45) Date of Patent: Sep. 24, 2024

(54) UNMANNED AERIAL VEHICLE

(71) Applicant: Bayer Aktiengesellschaft, Leverkusen (DE)

(72) Inventors: Malcolm Faers, Düsseldorf (DE); Andrew Charles Chapple, Langenfeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 245 days.

(21) Appl. No.: 17/593,125

(22) PCT Filed: Mar. 9, 2020

(86) PCT No.: PCT/EP2020/056175
§ 371 (c)(1),
(2) Date: Sep. 9, 2021

(87) PCT Pub. No.: WO2020/182711
PCT Pub. Date: Sep. 17, 2020

(65) Prior Publication Data
US 2022/0153417 A1   May 19, 2022

(30) Foreign Application Priority Data
Mar. 13, 2019 (EP) .................................... 19162513
Nov. 28, 2019 (EP) .................................... 19212201

(51) Int. Cl.
*B64D 1/18* (2006.01)
*A01M 7/00* (2006.01)
(Continued)

(52) U.S. Cl.
CPC .............. *B64D 1/18* (2013.01); *A01M 7/0042* (2013.01); *A01M 7/0089* (2013.01);
(Continued)

(58) Field of Classification Search
CPC ............................... B64D 1/18; B64U 2101/00
See application file for complete search history.

(56) References Cited

U.S. PATENT DOCUMENTS

| | | | |
|---|---|---|---|
| 2016/0307448 A1* | 10/2016 | Salnikov | .............. G08G 5/0043 |
| 2017/0129605 A1* | 5/2017 | Wu | .......................... B05B 12/02 |
| 2019/0247877 A1* | 8/2019 | Fideler | .................... B64C 15/00 |

FOREIGN PATENT DOCUMENTS

| | | |
|---|---|---|
| CN | 108552140 A | 9/2018 |
| JP | 2017529903 | 10/2017 |

(Continued)

OTHER PUBLICATIONS

International Search Report and Written Opinion for PCT Application No. PCTEP2020056175, mailed on Apr. 29, 2020, 13 pages.

(Continued)

*Primary Examiner* — Richard G Davis
(74) *Attorney, Agent, or Firm* — Morrison & Foerster LLP

(57) ABSTRACT

An unmanned aerial vehicle for application of an active ingredient to agricultural crops is configured to hold: a liquid comprising the active ingredient in at least one liquid reservoir housed within or attached to the unmanned aerial vehicle. At least one liquid application unit is housed within or attached to the unmanned aerial vehicle and in fluid communication with the at least one liquid reservoir. The housing of at least one sensor unit which is configured to determine sense information comprising sensing a functioning of one or more of: the at least one liquid reservoir, the at least one liquid application unit, the at least one operating unit. A processing unit determines an instruction to the unmanned aerial vehicle to dock with a base station and get a service from the base station. This determination step comprises utilization of sense information.

7 Claims, 6 Drawing Sheets

(51) Int. Cl.
    *B64C 39/02*       (2023.01)
    *G05D 1/00*       (2006.01)
    *B64U 101/00*     (2023.01)

(52) U.S. Cl.
    CPC ........... *B64C 39/024* (2013.01); *G05D 1/101* (2013.01); *G05D 1/12* (2013.01); *B64U 2101/00* (2023.01)

(56) References Cited

FOREIGN PATENT DOCUMENTS

| | | |
|---|---|---|
| JP | 2018127076 | 8/2018 |
| JP | 2019207555 | 12/2019 |
| JP | 2020083313 | 6/2020 |
| JP | 2022521806 | 4/2022 |
| WO | 2016192024 A1 | 12/2016 |
| WO | 2017131587 A1 | 8/2017 |
| WO | 2017138803 A1 | 8/2017 |
| WO | 2020116492 A1 | 6/2020 |

OTHER PUBLICATIONS

Extended European Search Report for European Application No. 19162513, mailed Sep. 10, 2019, 12 pages.

\* cited by examiner

UNMANNED AERIAL VEHICLE

CROSS REFERENCE TO RELATED APPLICATIONS

This application is a national stage application under 35 U.S.C. § 371 of International Application No. PCT/EP2020/056175, filed Mar. 9, 2020, which claims the benefit of priority to European Application Nos. 19162513.6, filed Mar. 13, 2019 and 19212201.8, filed Nov. 28, 2019.

FIELD OF THE INVENTION

The present disclosure relates to an unmanned aerial vehicle for application of an active ingredient to agricultural crops, to a base station for an unmanned aerial vehicle, to a system and method for application of an active ingredient to agricultural crops with an unmanned aerial vehicle and a base station, to a method for application of an active ingredient to agricultural crops by an unmanned aerial vehicle and to a method for servicing an unmanned aerial vehicle with a base station.

BACKGROUND OF THE INVENTION

The general background of this disclosure is the application of active ingredients in liquid form to foliage, being applied by vehicles using for example boom sprayers. Active ingredients, such as herbicides, insecticides, fungicides, pesticides and nutritional supplements, are required to be applied in agricultural environments. Controlling weeds, insects and diseases in crops is an important requirement for reducing losses in agriculture. This is commonly achieved by foliar spray of crops by spray application from tractors, back-pack sprayers and unmanned aerial vehicles (UAV) such as drones and radio controlled helicopters. A disadvantage of all these application techniques is e.g. that typically, the whole field is sprayed. It is also a demand to reduce the cost of such applications.

SUMMARY OF THE INVENTION

In general, there is a need to improve the spraying practice on agricultural fields and to facilitate application in new ways. The general public increasingly also wishes to see a reduction in any environmental impact associated with such application. It would be advantageous to have improved means of applying active ingredients in agricultural environments.

It should be noted that the following described aspects and examples of the invention apply also for the unmanned aerial vehicle for application of an active ingredient to agricultural crops, for the base station for one or more unmanned aerial vehicle, for the system and method for application of an active ingredient to agricultural crops with an unmanned aerial vehicle and a base station, for the method for application of an active ingredient to agricultural crops by an unmanned aerial vehicle and for the method for servicing an unmanned aerial vehicle with a base station.

According to a first aspect, there is provided an unmanned aerial vehicle for application of an active ingredient to agricultural crops, comprising:

a liquid reservoir. The at least one liquid reservoir is configured to hold a liquid comprising an active ingredient; and at least one liquid application unit. The at least one liquid application unit is in fluid communication with the at least one liquid reservoir, and at least one operating unit. The at least one operating unit is configured to enable the unmanned aerial vehicle to fly; and at least one sensor unit. The at least one sensor unit is configured to determine sense information comprising sensing a functioning of one or more of: the at least one liquid reservoir, the at least one liquid application unit, the at least one operating unit. The processing unit is configured to determine an instruction for the unmanned aerial vehicle to dock with a base station and get a service from the base station wherein the determination comprises utilization of the sense information.

In other words, the unmanned aerial vehicle (UAV) such as a drone, can apply an active ingredient, comprised within a liquid, to a plant. The UAV now has one or more sensor(s) to check the functioning of one or more parts of the UAV that are required for its purpose to apply active ingredient(s) to plants. If the functioning of a part of the UAV is impacted or ideally—estimated to be impacted—e.g. because the liquid in the liquid reservoir is soon used up or the liquid application unit is blocked respectively clogged or the power unit (as part of the operation unit) of the UAV need recharging respectively refilling, the UAV is instructed to dock to a base station. Ideally, the base station has already been informed about the functioning status of the UAV prior to the docketing of the UAV and is ready to provide an appropriate service (such as refilling of the liquid reservoir; recharging respectively refilling of the power unit) ideally as soon as the UAV has docketed to the base station. Furthermore, if the base station has already been informed about the functioning status of the UAV prior to the docketing of the UAV and the base station does not have the resources to service the UAV this information is used via the processing unit—which can be part of the UAV, or be external to the UAV—to steer the UAV to another base station which does have the resources to service the UAV. After the service the UAV can return to the recorded location and resume spray application. At the same time the flight paths of the UAVs are optimized to maximize their flight efficiency and to minimize bottlenecks at the base station. A base station could itself be an autonomous vehicle, which is capable of moving autonomously to a series of locations and capable of storing and transporting the UAV(s) between the different locations, allowing the base station(s) and UAV(s) to treat several locations autonomously.

In an example, the processing unit is configured to determine an instruction for the unmanned aerial vehicle to dock with a base station and to refill the at least one liquid reservoir with liquid comprising an active ingredient and/or to exchange the at least one liquid reservoir with an at least partially filled liquid reservoir with liquid comprising an active ingredient, wherein the determination comprises utilization of the sense information of the liquid level within the at least one liquid reservoir.

In other words, the sensor unit configured to sense the liquid level within the liquid reservoir remits this information (e.g. from time-to-time or continuously) to a processing unit which analyses the remaining liquid within the liquid reservoir housed within or attached to the UAV also in relation to the distance of the UAV to the next base station where the liquid reservoir housed within or attached to the UAV can be refilled. The liquid application unit is in fluid communication with the liquid reservoir and is configured to apply the liquid in the liquid reservoir to plants. The processing unit instructs the UAV to dock with a base station if a determination is made that the liquid reservoir housed within or attached to the UAV requires refilling. The liquid with the active ingredient to be refilled into the liquid reservoir could either be applied as a dilution in water, which is prepared on demand on the base station or the UAV comprises at least two liquid reservoirs—one with water and another with an active ingredient concentrate—and the dilution occurs in the application unit shortly before spraying. Additionally, one or more adjuvants could be utilized, either by addition to the liquid to be filled into the liquid reservoir of the UAV or as a separate liquid reservoir on the UAV. The adjuvants can be added e.g. in the application unit to the liquid with the active ingredient shortly before spraying. Alternatively, water, the active ingredient concentrate and adjuvants are mixed in the liquid application unit shortly before spraying. Additionally, the empty liquid reservoir housed within or attached to the UAV can be cleaned prior to the refilling of a new liquid by a service unit on the base station, which ensures operability of this part of the UAV and also allows the liquid reservoir to be refilled with lower concentrations of the same active ingredient or with other active ingredients which are not necessarily compatible with the remnants of the active ingredient in the empty liquid reservoir.

The liquid reservoir housed within or attached to the UAV can also be exchanged with another—at least partially filled liquid reservoir—which is typically a full liquid reservoir already stocked on the base station and ready-to-be used (plug-in reservoir). If further analysis by the processing unit shows that another active ingredient respectively other concentrations of the same active ingredient or certain other combinations of active ingredients are more appropriate to be applied to the remaining (untreated) plants this can be taken into consideration as well when refilling/exchanging the liquid reservoir at the base station. Alternatively, if it has been detected that the plants that have been already sprayed do have additional issues which need to be addressed such as e.g. an emerging pest which has not been detected before, the liquid reservoir on the UAV can be exchanged—respectively emptied and refilled—with a liquid reservoir that comprises an active ingredient that his able to tackle the recently detected issue and the plants can be sprayed again.

When the UAV does comprise at least two liquid reservoirs it is possible that one liquid reservoir is refilled at the base station with liquid comprising an active ingredient and—at the same time—the second liquid reservoir on the UAV is exchanged with another liquid reservoir on stock on the base station.

In an example, the processing unit is configured to determine an instruction for the unmanned aerial vehicle to dock with a base station and to clean, repair and/or exchange the at least one liquid application unit or a part of it wherein the determination comprises utilization of sense information of the operability of the at least one liquid application unit.

Thus, a sensor senses the functionality/operability of the liquid application unit housed within or attached to the UAV and remits this information (e.g. from time-to-time or continuously) to a processing unit which analyses the functionality/operability in relation to the distance of the UAV to the next base station where the application unit, or a part of it, housed within or attached to the UAV can be cleaned, repaired and/or exchanged. The processing unit instructs the UAV to dock with a base station if a determination is made that the liquid application unit housed within or attached to the UAV requires a service. The liquid application unit can e.g. comprise a spray gun, boom spray, spraying lance, spinning disk or a spray nozzle etc.

When the UAV does comprise at least two liquid reservoirs each with corresponding liquid application units it is possible that one liquid application unit needs no—respectively needs a different—service at the base station than the other liquid application unit. E.g. one liquid application unit is cleaned at the base station while the other liquid application is repaired respectively exchanged.

In an example, the processing unit is configured to determine an instruction for the unmanned aerial vehicle to dock with a base station and to recondition the at least one operating unit wherein the determination comprises utilization of sense information of the operability of the at least one operating unit.

In an example, the at least one operation unit comprises one or more of: a power unit, a flight controlling unit, a propeller engine unit, a propeller blade unit and a frame.

In this way, the at least one sensor senses the functionality/operability of the operation unit housed within respectively attached to the UAV and remits this information (e.g. from time-to-time or continuously) to a processing unit which analyses the functionality/operability in relation to the distance of the UAV to the next base station where the operation unit housed within or attached to the UAV can be reconditioned. The processing unit instructs the UAV to dock with a base station if a determination is made that the operating unit housed within or attached to the UAV requires a service. The term "recondition/ed" means that the operating unit which needs a service is—depending on the context—cleaned, reattached, recharged, refilled, repaired, replaced and/or exchanged.

According to a second aspect, there is provided a base station for one or more unmanned aerial vehicle, comprising at least one service unit, wherein the unmanned aerial vehicle comprises at least one liquid reservoir. The at least one liquid reservoir is configured to hold a liquid comprising an active ingredient; and at least one liquid application unit. The at least one liquid application unit is in fluid communication with the at least one liquid reservoir; and at least one operating unit. The at least one operating unit is configured to enable the one or more unmanned aerial vehicle to fly, and at least one sensor unit. The at least one sensor unit is configured to determine sense information comprising sensing a functioning of one or more of: the at least one liquid reservoir, the at least one liquid application unit, the at least one operating unit; and wherein a processing unit is configured to determine an instruction to the base station to enable one or more unmanned aerial vehicle to dock with the base station and wherein the processing unit is further configured to determine an instruction to the at least one service unit of the base station to provide a service to the one or more unmanned aerial vehicle wherein the determinations of the processing unit comprises utilization of sense information of the at least one sensor unit of one or more unmanned aerial vehicle.

In other words, a base station receives sensor information from an UAV—either already processed via a processing unit, or sensor information received from the UAV is processed at the base station with a processing unit as part of the base station. The processing unit makes a determination—which is (at least partly) based on the information received from the sensor information—and instructs the UAV, base station and/or the service unit in case the UAV needs to dock to the base station and get a service.

In an example, the processing unit is configured to determine an instruction to the base station to enable one or more unmanned aerial vehicle to dock with the base station and the processing unit is further configured to determine an instruction to the at least one service unit to refill at least one liquid reservoir of the one or more unmanned aerial vehicle with liquid comprising an active ingredient and/or to exchange the at least one liquid reservoir of the one or more unmanned aerial vehicle with an at least partially filled liquid reservoir with liquid comprising an active ingredient, wherein the one or more unmanned aerial vehicle comprises at least one sensor unit configured to sense the liquid level within the at least one liquid reservoir, and wherein the determinations of the processing unit comprises utilization of sense information of the at least one sensor unit of the one or more unmanned aerial vehicle.

In another example, the processing unit is configured to determine an instruction to the base station to enable one or more unmanned aerial vehicle to dock with the base station and the processing unit is further configured to determine an instruction to the at least one service unit to clean, repair and/or exchange the at least one liquid application unit or a part of it, wherein the one or more unmanned aerial vehicle comprises at least one sensor unit configured to sense the operability of the at least one liquid application unit, and wherein the determinations of the processing unit comprises utilization of sense information of the at least one sensor unit of the one or more unmanned aerial vehicle.

In an example, the processing unit is configured to determine an instruction to the base station to enable one or more unmanned aerial vehicle to dock with the base station and the processing unit is further configured to determine an instruction to the at least one service unit to recondition the at least one operating unit, wherein the one or more unmanned aerial vehicle comprises at least one sensor unit configured to sense the operability of the at least one operating unit, and wherein the determinations of the processing unit comprises utilization of sense information of the at least one sensor unit of the one or more unmanned aerial vehicle.

In another example, the base station comprises at least one sensor unit configured to sense one or more of: remaining airfield capacity for one or more unmanned aerial vehicle intended to dock to the base station; inventory of liquid reservoir(s), liquid(s) with active ingredient(s), liquid application unit(s), operating unit(s) in stock on the base station and wherein the determinations of the processing unit comprises utilization of sense information of the at least one sensor unit of the one or more unmanned aerial vehicle and of the at least one sensor unit of the base station.

Thus, the sensor information of the at least one sensor unit of the base station is forwarded to the processing unit and the processing unit is configured to determine an instruction to the UAV(s), base station and/or service unit(s) wherein the determination comprises utilization of the sense information. In other words, if e.g. the base station is informed about the functioning status of the UAV prior to the docketing of the UAV and the base station does not have the resources to service the UAV and/or does not have any space available for the UAV to dock to the base station this information is sensed with the at least one sensor unit of the base station and this information is used through the processing unit to steer the UAV to another base station which does have the resources to service the UAV or—e.g. if no airfield capacity is left on the base station for the time being but the resources to provide the required service to the UAV are available on this base station—to delay docketing of the UAV to the base station until free space is available on the base station.

According to a third aspect, there is provided a system for application of an active ingredient to agricultural crops, comprising
    at least one unmanned aerial vehicle according to the first aspect and any of the associated examples;
    at least one base station according to the second aspect and any of the associated examples;
    a processing unit.
    For an unmanned aerial vehicle of the at least one unmanned aerial vehicle, the at least one sensor unit is configured to determine sense information comprising sensing a functioning of one or more of: the at least one liquid reservoir, the at least one liquid application unit, the at least one operating unit and to relay the sense information to the processing unit,
    The processing unit is configured to determine an instruction for the unmanned aerial vehicle to dock with at least one base station. The processing unit is further configured to determine an instruction to the at least one base station to enable the unmanned aerial vehicle to dock with the at least one base station. The processing unit is further configured to determine an instruction to the at least one service unit of the at least one base station to provide a service to the unmanned aerial vehicle. All determinations of the processing unit comprises utilization of sense information of the at least one sensor unit of the at least one unmanned aerial vehicle.

According to a fourth aspect, there is provided a method for application of an active ingredient to agricultural crops with at least one unmanned aerial vehicle and at least one base station, comprising:
a) holding a liquid comprising an active ingredient in at least one liquid reservoir housed within or attached an unmanned aerial vehicle, wherein the at least one liquid application unit is housed within or attached to the unmanned aerial vehicle, and the at least one liquid application unit is in fluid communication with the at least one liquid reservoir;
b) housing of at least one operating unit within or attached to the unmanned aerial vehicle which is configured to enable the at least one unmanned aerial vehicle to fly;
c) housing of at least one sensor unit within or attached to the at least one unmanned aerial vehicle which is configured to determine sense information comprising sensing a functioning of one or more of: the at least one liquid reservoir, the at least one liquid application unit, the at least one operating unit;
d) sensing a functioning of one or more of: the at least one liquid reservoir, the at least one liquid application unit, the at least one operating unit with the at least one sensor unit of the at least one unmanned aerial vehicle to provide sense information and relay it to the processing unit;
e) docking the at least one unmanned aerial vehicle to the at least one base station if so instructed by the processing unit wherein the determination for the instruction comprises utilization of sense information; and
f) servicing the at least one unmanned aerial vehicle with the at least one service unit of the at least one base station if so instructed by the processing unit wherein the determination for the instruction comprises utilization of sense information.

According to a fifth aspect, there is provided a method for application of an active ingredient to agricultural crops by an unmanned aerial vehicle, comprising:

a) holding a liquid comprising an active ingredient in at least one liquid reservoir housed within or attached to the unmanned aerial vehicle, wherein at least one liquid application unit is housed within or attached to the unmanned aerial vehicle and the at least one liquid application unit is in fluid communication with the at least one liquid reservoir;

b) housing of at least one operating unit within or attached to the unmanned aerial vehicle which is configured to enable the unmanned aerial vehicle to fly;

c) housing of at least one sensor unit within or attached to the unmanned aerial vehicle which is configured to determine sense information comprising sensing a functioning of one or more of: the at least one liquid reservoir, the at least one liquid application unit, the at least one operating unit;

d) sensing a functioning of one or more of: the at least one liquid reservoir, the at least one liquid application unit, the at least one operating unit; with the at least one sensor unit to provide sense information and relay it to the processing unit; and e) determining an instruction to the unmanned aerial vehicle to dock with a base station and get a service from the base station by the processing unit, wherein the determining step comprises utilization of the sense information.

According to a sixth aspect, there is provided a method for servicing an unmanned aerial vehicle with a base station, comprising:

a) housing of at least one service unit within or attached to a base station;

b) holding a liquid comprising an active ingredient in at least one liquid reservoir housed within or attached to the unmanned aerial vehicle, wherein at least one liquid application unit is housed within or attached to the unmanned aerial vehicle, and the at least one liquid application unit is in fluid communication with the at least one liquid reservoir;

c) housing of at least one operating unit within or attached to the unmanned aerial vehicle which is configured to enable the unmanned aerial vehicle to fly;

d) housing of at least one sensor unit within or attached to the unmanned aerial vehicle which is configured to determine sense information comprising sensing a functioning of one or more of: the at least one liquid reservoir, the at least one liquid application unit, the at least one operating unit;

e) sensing a functioning of one or more of: the at least one liquid reservoir, the at least one liquid application unit, the at least one operating unit; with the at least one sensor unit to provide sense information and relay it to the processing unit;

f) determining an instruction to the base station to enable the unmanned aerial vehicle to dock with the base station by the processing unit, wherein the determining step comprises utilization of the sense information; and g) determining an instruction to the at least one service unit within or attached to the base station to provide a service to the unmanned aerial vehicle by the processing unit, wherein the determining step comprises utilization of the sense information.

Advantageously, the benefits provided by any of the above aspects equally apply to all of the other aspects and vice versa.

BRIEF DESCRIPTION OF THE DRAWINGS

Exemplary embodiments will be described in the following, by way of example only, with reference to the following drawings.

DETAILED DESCRIPTION OF EMBODIMENTS

Figure 1:
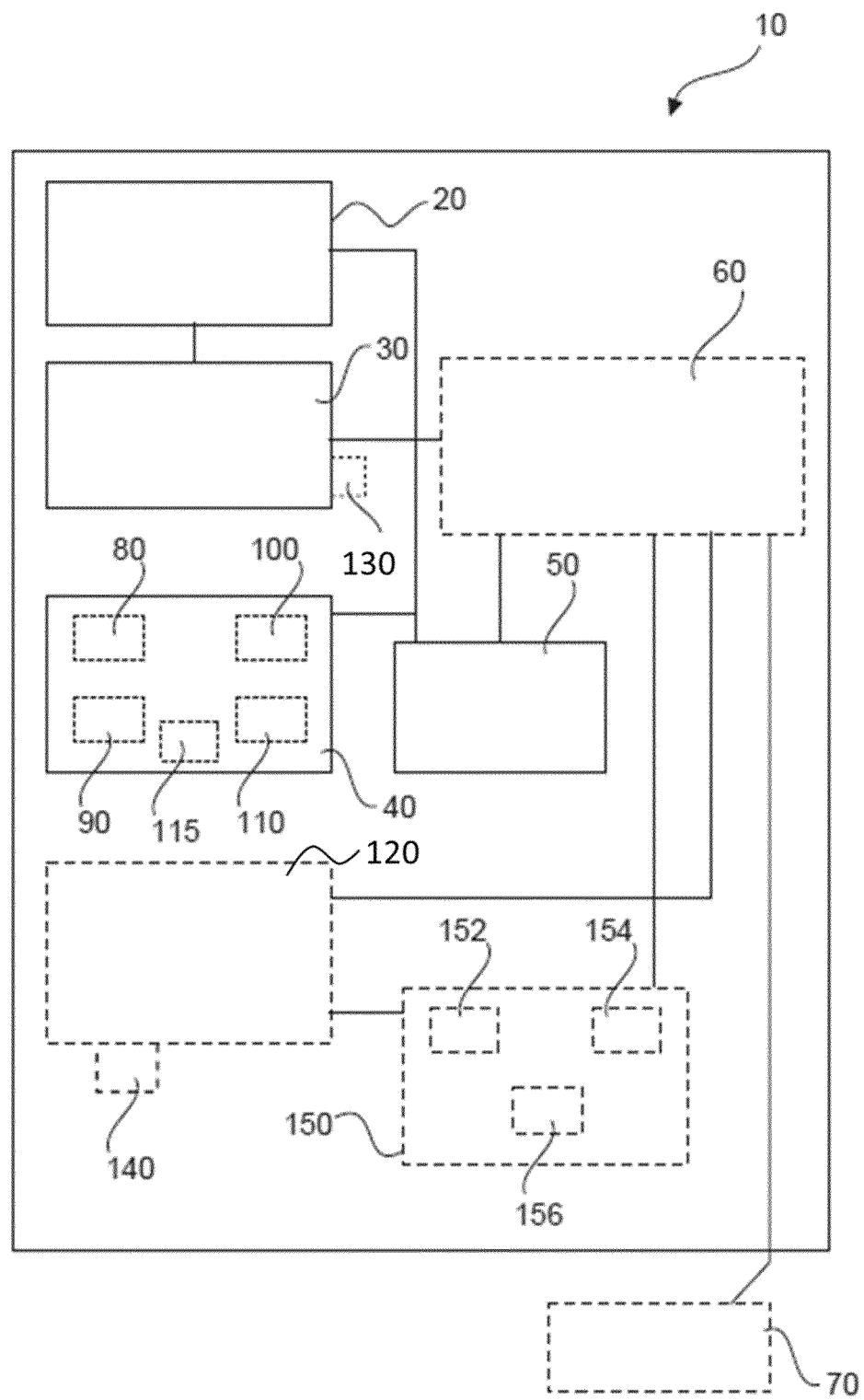
FIG. 1 shows a schematic set up of an example of an unmanned aerial vehicle for application of an active ingredient to agricultural crops.

FIG. 1 shows an example of an unmanned aerial vehicle 10 for application of an active ingredient to agricultural crops. The unmanned aerial vehicle (UAV) 10 comprises a liquid reservoir 20. The at least one liquid reservoir 20 is configured to hold a liquid comprising an active ingredient. The UAV 10 also comprises at least one liquid application unit 30. The at least one liquid application 30 unit is in fluid communication with the liquid reservoir 20. The UAV 10 further comprises at least operating unit 40 and at least one sensor unit 50. The at least one operating unit 40 is configured to enable the unmanned aerial vehicle to fly. The at least one sensor unit 50 is configured to determine sense information comprising sensing a functioning of one or more of: the at least one liquid reservoir 20, the at least one liquid application unit 30, the at least one operating unit 40. A processing unit 60—which could be within or attached to the UAV, or be external to the UAV—is configured to determine an instruction for the unmanned aerial vehicle to dock with a base station 70 and get a service from the base station wherein the determination comprises utilization of the sense information.

In an example, the processing unit is configured to determine whether one or more services are provided by the base station. In order to increase the efficacy simultaneous services at the same base station are preferred. As an illustration, if the liquid reservoir is refilled at a base station the power unit (as part of the operating unit) is—at the same—time also recharged/refilled.

In an example, the at least one sensor unit is configured to determine sense information comprising sensing a functioning of: the at least one liquid reservoir, the at least one liquid application unit and the at least one operation unit.

According to an example, the processing unit is configured to determine an instruction for the unmanned aerial vehicle to dock with a base station and to refill the at least one liquid reservoir with liquid comprising an active ingredient and/or to exchange the at least one liquid reservoir with an at least partially filled (typically a full) liquid reservoir with liquid comprising an active ingredient, wherein the determination comprises utilization of the sense information of the liquid level within the at least one liquid reservoir.

In an example, the term "partially filled" refers to a liquid reservoir which does comprise at least some liquid comprising active ingredient. Typically, the liquid reservoir is at least half-full, at least three-fourths full, respectively full.

In an example, the at least one liquid reservoir to be refilled with liquid comprising an active ingredient is cleaned prior to the refilling with the liquid comprising an active ingredient.

As an example the UAV is steering to a base station when ⅔ of the liquid in the liquid reservoir has been used up and the spraying amount on the—so far unsprayed—path from the current location of the UAV to the next base station requires the remaining ⅓ of the liquid in the liquid reservoir.

In an example, liquid level sensors configured to sense point levels in liquids comprise magnetic and mechanical floats, pressure sensors, electroconductive sensing or electrostatic (capacitance or inductance) detectors and by measurement of a signal's time-of-flight to the fluid surface, through electromagnetic (such as magnetostrictive), ultrasonic, radar or optical sensors etc.

In an example, liquid level sensors configured to sense continuous levels in liquids comprise magnetostrictive level sensors, resistive chain level sensors, magnetoresistance float level sensors, hydrostatic pressure level sensors, air bubbler etc.

According to an example, the processing unit is configured to determine an instruction for the unmanned aerial vehicle to dock with a base station and to clean, repair and/or exchange the at least one liquid application unit or a part of it wherein the determination comprises utilization of sense information of the operability of the at least one liquid application unit.

In an example, the exchange of the at least one liquid application unit or part of it refers to the exchange of the at least one liquid application unit or part of it of the UAV with an operable liquid application unit or part of it.

In an example, the liquid application unit comprises a spray gun, boom sprayer, spraying lance, spraying injector, spinning disc and/or spray nozzle; configured to spray the liquid which optionally comprises atomization of that liquid as part of the spray process.

In an example, the liquid application unit comprises an application device configured to contact vegetation during application of the liquid. An example of such an application device is a paintbrush type device, which dispenses liquid to the brushes which is applied to foliage in a brushing manner.

The functionality/operability can be impacted if the spray gun, boom sprayer, spraying lance, spraying injector and/or spray nozzle is/are clogged or partly clogged by ingredients in the liquid with the active ingredient (e.g. if unwanted crystallization of certain ingredients occurs).

In an example, the at least one sensor unit is configured to determine sense information comprising sensing a clogging of the at least one liquid application unit and the processing unit is configured to determine an instruction for the unmanned aerial vehicle to dock with a base station and to clean, repair and/or exchange the at least one liquid application unit or a part of it wherein the determination comprises utilization of sense information of the clogging of the at least one liquid application unit.

In an example, the sensor for the at least one liquid application unit senses the clogging via measurement of a change in the pressure of the liquid to be sprayed through the at least one liquid application unit to the plants.

In another example, the sensor for the at least one liquid application unit senses the clogging via a measurement of a (e.g. visual) change in the spraying pattern of the at least one liquid application unit e.g. with a camera.

In an example, the term "clogging" refers to a decrease in the flow rate of the liquid in the at least one liquid application unit, particularly a decrease in the flow rate of the liquid within a pipe of the at least one liquid application unit; and/or a spray gun, a boom sprayer, a spraying lance, a spraying injector and/or spray nozzle of the liquid application unit (even though the liquid flow pressure remains the same).

According to an example, the processing unit is configured to determine an instruction for the unmanned aerial vehicle to dock with a base station and to recondition the at least one operating unit wherein the determination comprises utilization of sense information of the operability of the at least one operating unit.

According to an example, the at least one operation unit comprises one or more of: a power unit 80, a flight controlling unit 90, a propeller engine unit 100, a propeller blade unit 110 and a frame 115.

In an example, the power unit is configured to comprise an accumulator, battery (such as a lithium polymer battery), fuel tank, gasoline tank, hybrid fuel cell, etc.

In another example, the flight controlling unit is configured to comprise a computer and software for managing functions related to a flight of the UAV wherein the flight controlling unit is further configured to receive instructions from the processing unit.

In another example, the propeller engine unit is configured to comprise one or more engine(s) to twist one or more propeller blade(s). As an example, a quadcopter, also called a quadrotor helicopter or quadrotor is a multirotor helicopter that is lifted and propelled by four engines.

In another example, the propeller blade unit is configured to comprise one or more propeller blade(s). The propeller blades are a component of the UAV that is damaged and replaced often.

In another example, the frame is configured to house the components of the operation unit of the UAV.

In another example, the frame is configured to house all components of the UAV.

In an example, the power unit is configured to comprise an accumulator/battery and the operability of the accumulator/battery is sensed with a coulomb counter or an impedance tracker.

In an example, the power unit is configured to comprise a fuel/gasoline tank and the operability of the fuel/gasoline tank is sensed e.g. with a magnetoresistance type fuel level sensor.

In another example, the flight controlling unit is configured to comprise a sensor to sense defects in the operability of the inertial measurement unit (IMU). The IMU detects the current rate of acceleration of the UAV using one or more accelerometers. The IMU detects changes in rotational attributes like pitch, roll and yaw using one or more gyroscopes. Some IMU include a magnetometer to assist with calibration against orientation drift.

In another example, the propeller engine unit is configured to comprise a sensor to sense the operability of the propeller engine unit. Operability of the propeller engine unit can alternatively also be senses by the sensors of the flight controlling unit.

In another example, the propeller blade unit is configured to comprise a sensor to sense the operability of the propeller blades. This sensor can be an optical sensor e.g. a camera in the proximity of the blades e.g. mounted below the hoop on an UAVs rotor arm which senses e.g. the regularity of the propeller blade shape and/or the consistency of the movement of the propeller blades.

In an example, reconditioning of the operating unit relates to the refilling/recharging of the power unit.

In another example, reconditioning of the operating unit relates to the uploading of new software or an update of the existing operational software of the flight controlling unit.

In another example, reconditioning of the operating unit relates to a maintenance service provided to the propeller engine unit such as e.g. cleaning of the propeller engine unit or—depending on the type of engine used—applying lubricating oil to the propeller engine unit etc.

In another example, reconditioning of the propeller blade unit relates to a maintenance service provided to the propeller blade unit such as e.g. cleaning of the propeller blades or reattachment of the blades if they are partly detached.

In an example, replacement of the operating unit can relate to the removal of a removable accumulator which is empty and the introduction of a fully charged accumulator.

In another example, replacement of the operating unit can relate to the removal of a (e.g. broken or old) flight control unit such as a computer chip with software to control the flight of the UAV and the introduction of an operational flight control unit such as a computer chip with the software.

In another example, replacement of the operating unit can relate to the removal of a (e.g. broken or old) propeller engine unit and the introduction of a fully operational propeller engine.

In another example, replacement of the operating unit can relate to the removal of a (e.g. broken or detached) propeller blade respectively propeller blade unit and the introduction of a fully operational propeller blade respectively propeller blade unit.

In a further example, the unmanned aerial vehicle according to the invention, comprises at least one operating unit with at least one power unit wherein a processing unit is configured to determine an instruction for the unmanned aerial vehicle to dock with a base station and to recharge/refill the at least one power unit wherein the determination comprises utilization of sense information of the energy status of the at least one power unit.

In another example, the at least one liquid application unit is configured to receive at least one input from a processing unit. The at least one input is useable to activate the at least one liquid application unit.

In a further example, the unmanned aerial vehicle according to the invention comprises a processing unit 60.

In a further example, the processing unit is configured to carry out the analysis of the sense information of the at least one sensor unit.

In another example, the functionality of the at least one sensor unit also senses with an additional sensor sensing unit.

According to an example, the processing unit is configured to determine an instruction for the unmanned aerial vehicle to dock with a base station and to exchange the at least one sensor unit or a part of it with an operable sensor unit or part of it, wherein the determination comprises utilization of sense information of the operability of the at least one sensor unit with an additional sensor sensing unit.

Another example refers to an unmanned aerial vehicle according to the invention, wherein the at least one liquid application unit is configured to be activated at a location determined by a processing unit based on image analysis of at least one image of the environment acquired by a camera.

Another example refers to an unmanned aerial vehicle according to the invention, wherein a processing unit is configured to carry out the analysis of the at least one image to determine the location for activation of the at least one liquid application unit.

In a further example, the unmanned aerial vehicle according to the invention comprises a processing unit which does both the image analysis and the analysis of the sense information.

In a further example, the unmanned aerial vehicle according to the invention comprises a processing unit, wherein the processing unit is configured to carry out the analysis of the sense information of the at least one sensor unit and the analysis of the at least one image to determine the location for activation of the at least one liquid application unit.

Another example refers to an unmanned aerial vehicle according to invention, wherein the unmanned aerial vehicle comprises a camera 120, wherein the camera is configured to acquire the at least one image.

Imagery of an environment can be acquired by an UAV, or indeed be acquired by a different platform that could have previously acquired the imagery. The imagery is transmitted to a processing unit that again could be in the UAV, or be external to the UAV. The processing unit analyses the imagery to determine a location for activation of the liquid application unit carried by the UAV. In this way, offline processing in a computer for example in a farmer's office or base station, imagery acquired of a field can be used to determine in effect a map of locations where specific active ingredients, within a liquid, should be applied by an UAV (such as a drone) in that field. In this way, in an example a drone can have a processing unit and be provided with imagery acquired by a different platform. The drone then analyses the imagery to determine a location to activate its liquid application unit. Thus, the drone can be flying and determine a location for activation of its liquid application unit, fly to an appropriate site and then apply the liquid at that location.

Yet, another example refers to an unmanned aerial vehicle according to the invention, wherein analysis of the at least one image to determine the at least one location for activation of the at least one liquid application unit comprises a determination of at least one type of weed, and/or comprises a determination of at least one type of disease, and/or comprises a determination of at least one type of pest, and/or comprises a determination of at least one type of insect, and/or comprises a determination of at least one type of nutritional deficiency.

In other words, the liquid application unit can be activated and the liquid applied in a manner to account for there being weeds to be controlled at a location and wherein the type of weed to be controlled can be taken into account, and/or account for their being diseases to be controlled at a location and wherein the type of disease to be controlled can be taken into account, and/or account for their being pests to be controlled at a location and wherein the type of pest to be controlled can be taken into account, and/or account for their being insects to be controlled at a location and wherein the type of insect to be controlled can be taken into account, and/or account for their being nutritional deficiencies to be mitigated at a location and wherein the type of nutritional deficiency to be mitigated can be taken into account. Thus, an unmanned aerial vehicle such as a drone can fly around an environment such as a field, and on the basis of image processing of images acquired of the field, and a determination that there are weeds, and what the type of weed is and where it is located, and a liquid containing the required active ingredient to control that weed and/or that type of weed can be applied at the location of the weed. A drone can have a number of different liquid reservoirs containing different liquids with different active ingredients, and on the basis of the identified weed the appropriate liquid can be applied over the weed. Also, there can be a number of different drones flying around the field, each with a different liquid within its liquid reservoir containing different active ingredients, and the different drones can apply the liquid they carry where required. For example, in a specific example when a drone has a camera if that drone images a weed that requires application with the liquid it carries, then it can immediately apply that liquid to that weed. However, if a determination is made that that weed should be controlled by a different liquid then this information and the location of the weed and the type of liquid to be applied at that location can be communicated to a different drone, where that information could be communicated from the first drone or via a processing unit that is external to the first drone, to a second drone that carries the correct liquid. This second drone then flies to the weed and applies the correct liquid over the weed. The unmanned aerial vehicle or vehicles operate in the same way with respect to controlling diseases, pests, insects and mitigating nutritional deficiencies. In this way, the correct chemical is used in each location increasing the effectiveness of application, and there are associated environmental advantages because the chemicals are used only where necessary.

In an example, analysis of the at least one image comprises utilization of a machine learning algorithm.

In an example, the machine learning algorithm comprises a decision tree algorithm.

In an example, the machine learning algorithm comprises an artificial neural network.

In an example, the machine learning algorithm has been taught on the basis of a plurality of images. In an example, the machine learning algorithm has been taught on the basis of a plurality of images containing imagery of at least one type of weed, and/or at least of type of plant suffering from one or more diseases, and/or at least one type of plant suffering from insect infestation from one or more types of insect, and/or at least one type of insect (when the imagery has sufficient resolution), and/or at least one type of plant suffering from one or more pests, and/or at least one type of plant suffering from one or more types of nutritional deficiency.

In an example, the machine learning algorithm has been taught on the basis of a plurality of images containing such imagery.

Thus a UAV 10 can have a one camera 120 and a processing unit 60 which uses the imagery acquired by the camera to activate the liquid application unit 30. The camera 120 acquires imagery of the environment of a field. The imagery need not be acquired by the drone 10, but could be acquired by a different drone and then passed to the drone 10 for processing. Alternatively it could be acquired by a base station 70 and then passed to the drone 10 for processing. The imagery acquired by the camera 120 is at a resolution that enables vegetation to be identified as vegetation and indeed can be at resolution that enables one type of weed to be differentiated from another type of weed. The imagery can be at a resolution that enables pest or insect infested crops to be determined, either from the imagery of the crop itself or from acquisition of for examples insects themselves. The drone 10 can have a Global Positioning System (GPS) 152 and this enables the location of acquired imagery to be determined. For example the orientation of cameras 120 and the position of the drone 10 when imagery was acquired can be used to determine the geographical footprint of the image at the ground plane. The drone 10 can also have inertial navigation systems 154, based for example on laser gyroscopes. In addition to being used to determine the orientation of the drone 10 and hence of the camera 120, facilitating a determination of where on the ground the imagery has been acquired, the inertial navigation systems 154 can function alone without a GPS 152 to determine the position of the drone, by determining movement away from a known or a number of known locations, such as a base station. In an example, the inertial navigation system can be part of the IMU of the flight controlling unit as discussed above. The camera 120 passes the acquired imagery to the processing unit 60. Image analysis software operates on the processing unit 60. The image analysis software can use feature extraction, such as edge detection, and object detection analysis that for example can identify structures such in and around the field such as buildings, roads, fences, hedges, etc. Thus, on the basis of known locations of such objects, the processing unit can patch the acquired imagery to in effect create a synthetic representation of the environment that can in effect be overlaid over a geographical map of the environment. Thus, the geographical location of each image can be determined, and there need not be associated GPS and/or inertial navigation based information associated with acquired imagery. In other words, an image based location system 156 can be used to locate the drone 10. However, if there is GPS and/or inertial navigation information available then such image analysis, that can place specific images at specific geographical locations only on the basis of the imagery, is not required. Although, if GPS and/or inertial navigation based information is available then such image analysis can be used to augment the geographical location associated with an image. The processing unit 60 runs further image processing software. This software analyses an image to determine the areas within the image where vegetation is to be found, and also analyses the imagery to determine where vegetation is not to be found (for example at pathways across a field, around the borders of a field and even tractor wheel tracks across a field). This latter information can be used to determine where the liquid is not required to be applied. Vegetation can be detected based on the shape of features within acquired images, where for example edge detection software is used to delineate the outer perimeter of objects and the outer perimeter of features within the outer perimeter of the object itself; organic material between ballast can be detected in a similar manner when the unmanned aerial vehicle is used for weed control along a railway track environment. A database of vegetation imagery can be used in helping determine if a feature in imagery relates to vegetation or not, using for example a trained machine learning algorithm such as an artificial neural network or decision tree analysis. The camera can acquire multi-spectral imagery, with imagery having information relating to the color within images, and this can be used alone, or in combination with feature detection to determine where in an image vegetation is to be found. As discussed above, because the geographical location of an image can be determined, from knowledge of the size of an image on the ground, the location or locations of vegetation, and/or other areas where the liquid is to be applied, can be found in an image and can then be mapped to the exact position of that vegetation (area) on the ground. The processing unit 60 then runs further image processing software that can be part of the image processing that determines vegetation location on the basis of feature extraction, if that is used. This software comprises a machine learning analyzer. Images of specific weeds are acquired, with information also relating to the size of weeds being used. Information relating to a geographical location in the world, where such a weed is to be found and information relating to a time of year when that weed is to be found, including when in flower etc. can be tagged with the imagery. The names of the weeds can also be tagged with the imagery of the weeds. The machine learning analyzer, which can be based on an artificial neural network or a decision tree analyzer, is then trained on this ground truth acquired imagery. In this way, when a new image of vegetation is presented to the analyzer, where such an image can have an associated time stamp such as time of year and a geographical location such as Germany or South Africa tagged to it, the analyzer determines the specific type of weed that is in the image through a comparison of imagery of a weed found in the new image with imagery of different weeds it has been trained on, where the size of weeds, and where and when they grow can also be taken into account. The specific location of that weed type on the ground within the environment, and its size, can therefore be determined. The processing unit 60 has access to a database containing different weed types, and the optimum liquid to be applied over that weed. This database has been compiled from experimentally determined data. The image processing software, using the machine learning algorithm, has also been taught to recognize insects, plants infested with insects, plants suffering from pests, and plants that are suffering from nutritional deficiencies. This is done in the same manner as discussed above, through training based on previously acquired imagery. The database also contains what liquid should be applied in what situation.

Yet in another example, the unmanned aerial vehicle comprises at least one liquid application unit which is moveable with respect to the unmanned aerial vehicle, wherein a processor of the unmanned aerial vehicle is configured to move the at least liquid application unit. In this manner, the UAV can apply liquid in a very targeted manner to individual plants if required.

Another example refers to an unmanned aerial vehicle wherein the at least one liquid application unit is mounted on at least one extendable arm 130.

In an example of the invention, the unmanned aerial vehicle comprises a camera, the camera is configured to move with respect to the unmanned aerial vehicle, wherein a processor of the unmanned aerial vehicle is configured to move the camera. In an example, the camera is mounted on an extendable arm 140.

In this manner, as the UAV is flying around, the camera can be moved in order to image different parts of the environment without having to change an orientation of the UAV, as would be required if the camera was in a fixed position.

In an example, the extendable arm upon which the camera is mounted is the same extendable arm upon which the liquid application unit is mounted.

In an example, the processor of the unmanned aerial vehicle that is configured to move the camera is the processing unit that is configured to analyze the image of the environment and the sense information.

Another example refers to an unmanned aerial vehicle wherein the unmanned aerial vehicle comprises location determining means 150. In a further example, the location determining means 150 comprise one or more of a GPS 152, an inertial navigation systems 154, or an image based location system 156.

In an example, the location determining means is configured to provide the processing unit with at least one location associated with the camera when the at least one image was acquired. The location can be a geographical location, with respect to a precise location on the ground, or can be a location on the ground that is referenced to another position or positions on the ground, such as a boundary of a field or the location of a base station. In other words, an absolute geographical location can be utilized or a location on the ground that need not be known in absolute terms, but that is referenced to a known location can be used. Thus, by correlating an image with the location where it was acquired, the liquid application unit can be accurately activated to that location. Thus, even when for example a drone has run out of liquid, and is flying back to a base station to fill up with liquid, it can continue to acquire imagery to be used to activate the liquid application unit at specific locations even if that location is not immediately addressed but is liquid is applied later when the drone has re-charged. Also, when the drone determines that a location should have a liquid applied that it is not carrying that information can be logged and used by that drone later when it carries the required liquid or transmitted to another drone that carries that liquid, and that other drone can fly to the location and apply its liquid at that location. Alternatively, it can transmit this information through the processing unit to a base station which activates UAVs on the base station to be filled with the required liquid to fly to the location and apply their liquid to that location. It's also possible that through the processing unit UAVs closer to the base station are instructed to dock to the base station in order to get the required liquid and apply them to the identified location more economically and efficiently.

In an example, the location is an absolute geographical location.

In an example, the location is a location that is determined with reference to a known location or locations. In other words, an image can be determined to be associated with a specific location on the ground, without knowing its precise geographical position, but by knowing the location where an image was acquired with respect to known position(s) on the ground the liquid application unit can then be activated at a later time at that location by moving the liquid application unit to that location or enabling another unmanned aerial vehicle to move to that location at activate its liquid application unit at that location.

In an example, a GPS unit 152 is used to determine, and/or is used in determining, the location, such as the location of the camera when specific images were acquired.

In an example, an inertial navigation unit 154 is used alone, or in combination with a GPS unit, to determine the location, such as the location of the camera when specific images were acquired. Thus for example, the inertial navigation unit, comprising for example one or more laser gyroscopes, is calibrated or zeroed at a known location (such as a base station) and as it moves with the at least one camera the movement away from that known location in x, y, and z coordinates can be determined, from which the location of the at least one camera when images were acquired can be determined.

In an example, image processing of acquired imagery 156 is used alone, or in combination with a GPS unit, or in combination with a GPS unit and inertial navigation unit, to determine the location, such as the location of the camera when specific images were acquired. In other words, as the vehicle moves it can acquire imagery that is used to render a synthetic representation of the environment and from specific markers, such as the position of trees, field boundaries, roads etc. the vehicle can determine its position within that synthetic environment from imagery it acquires.

In an example, the data communication between different components of the UAV can occur via networks such as local area networks, wide area networks, internetworks or internet, using wireline or wireless links, including terrestrial or satellite links.

Figure 2:
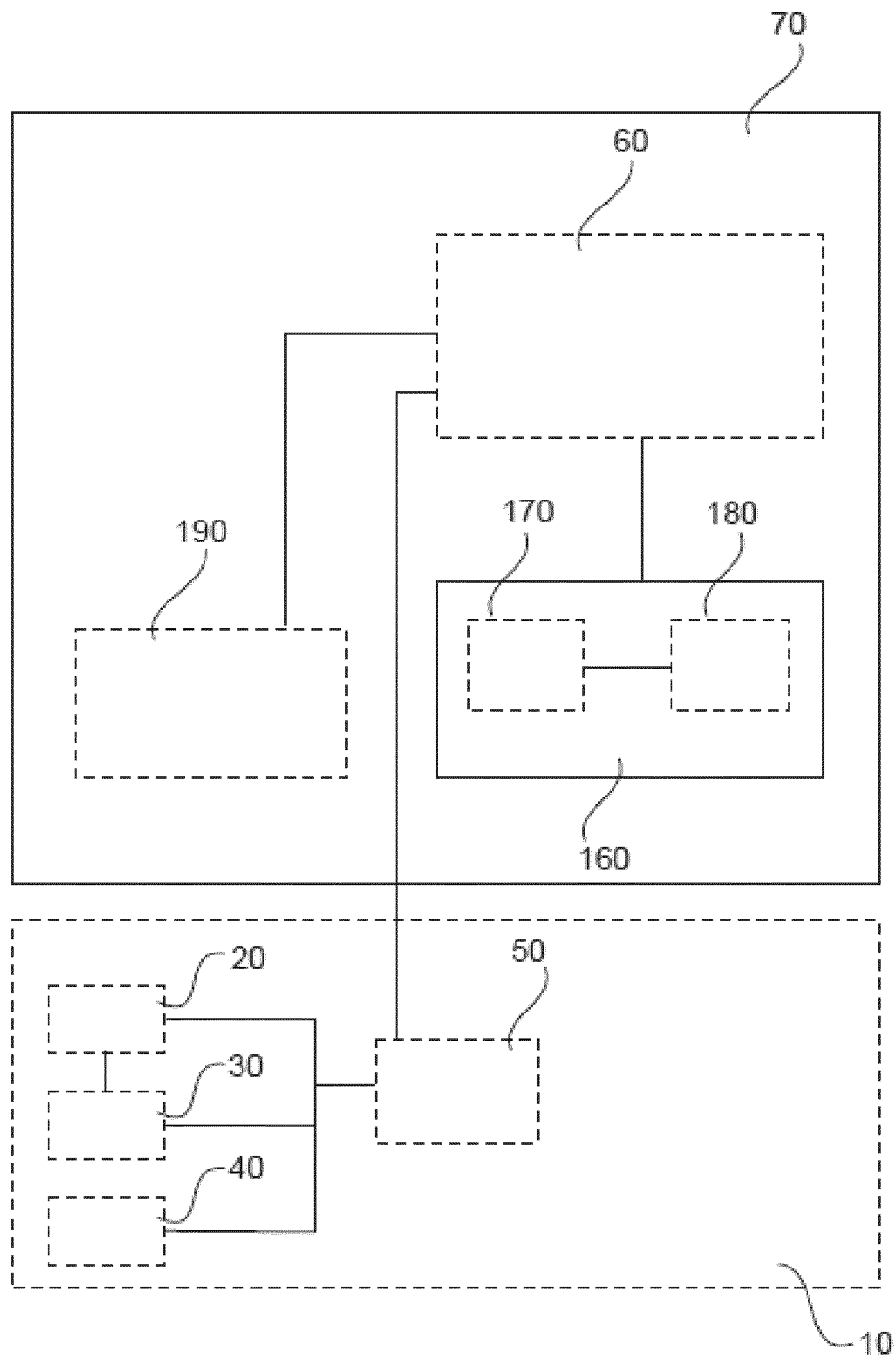
FIG. 2 shows a schematic set up of an example of a base station for an unmanned aerial vehicle system for application of an active ingredient to agricultural crops.

FIG. 2 shows an example of a base station 70 for one or more unmanned aerial vehicle 10, comprising at least one service unit 160. The unmanned aerial vehicle comprises at least one liquid reservoir 20, at least one liquid application unit 30, at least one operating unit 40 and at least one sensor unit 50. The at least one liquid reservoir is configured to hold a liquid comprising an active ingredient. The at least one liquid application unit is further in fluid communication with the at least one liquid reservoir. In addition, the at least one operating unit is configured to enable one or more unmanned aerial vehicle to fly. The at least one sensor unit is configured to determine sense information comprising sensing a functioning of one or more of: the at least one liquid reservoir, the at least one liquid application unit, the at least one operating unit. The processing unit 60 that could be in the base station, or be external to the base station is configured to determine an instruction to the base station to enable one or more unmanned aerial vehicle to dock with the base station. The processing unit is further configured to determine an instruction to the at least one service unit of the base station to provide a service to one or more unmanned aerial vehicle. The determinations of the processing unit comprises utilization of sense information of the at least one sensor unit of the one or more unmanned aerial vehicle.

In an example, the at least one sensor unit is configured to determine sense information comprising sensing a functioning of the at least one liquid reservoir, the at least one liquid application unit and the at least one operating unit.

In an example, the base station could further carry a small sensing UAV fitted with sensors such as multispectral cameras which can fly over target fields and identify which products are most suitable for application. The small sensing UAV could also map the target fields to allow precision application to regions where product application is required and also to identify regions where application is not required. The base station could through a processing unit program the flight paths of the UAV with the data from the small sensing UAV. Alternatively, the data could be transmitted to a processing unit external to the base station where the data could be analyzed and flight paths communicated back to the UAVs.

In a further example, the small sensing UAV could also provide information on moisture levels on plants, especially from dew early in the morning and after rainfall, which could be included in the design of the flight paths. This data could also be used to select an appropriate liquid application unit such as nozzles for the UAVs.

In an example, the at least one operating unit 40 of the UAV comprises one or more of: a power unit 80, a flight controlling unit 90, a propeller engine unit 100, a propeller blade unit 110 and a frame 115.

In another example, the at least one service unit comprises liquid reservoir(s), liquid(s) with active ingredient(s), liquid applications unit(s) such as e.g. a variety of nozzles, spare parts for the operating unit, recharging/refilling widget(s) for the power unit of the operating unit etc.

In another example, the at least one service unit comprises a robot arm 170. In another example, the at least one service unit comprises a robot arm with a robot-gripper 180.

In another example, the at least one service unit is configured to move autonomously.

In another example, the at least one service unit does have wheels.

In another example, the processing unit is configured to determine an instruction to the base station to move autonomously to another location wherein the determination comprises utilization of the sense information from the at least one UAV.

According to an example, a processing unit is configured to determine an instruction to the base station to enable one or more unmanned aerial vehicle to dock with the base station and wherein the processing unit is further configured to determine an instruction to the at least one service unit to refill at least one liquid reservoir of the one or more unmanned aerial vehicle with liquid comprising an active ingredient and/or to exchange the at least one liquid reservoir of the one or more unmanned aerial vehicle with an at least partially filled (typically a full) liquid reservoir with liquid comprising an active ingredient, wherein the one or more unmanned aerial vehicle comprises at least one sensor unit configured to sense the liquid level within the at least one liquid reservoir, and wherein the determinations of the processing unit comprises utilization of sense information of the at least one sensor unit of the one or more unmanned aerial vehicle.

According to an example, a processing unit is configured to determine an instruction to the base station to enable one or more unmanned aerial vehicle to dock with the base station and wherein the processing unit is further configured to determine an instruction to the at least one service unit to clean the at least one liquid reservoir of the one or more unmanned aerial vehicle and then to refill the at least one liquid reservoir with liquid comprising an active ingredient, wherein the one or more unmanned aerial vehicle comprises at least one sensor unit configured to sense the liquid level within the at least one liquid reservoir, and wherein the determinations of the processing unit comprises utilization of sense information of the at least one sensor unit of the one or more unmanned aerial vehicle.

According to an example, a processing unit is configured to determine an instruction to the base station to enable one or more unmanned aerial vehicle to dock with the base station and wherein the processing unit is further configured to determine an instruction to the at least one service unit to clean, repair and/or exchange the at least one liquid application unit or a part of it, wherein the one or more unmanned aerial vehicle comprises at least one sensor unit configured to sense the operability of the at least one liquid application unit, and wherein the determinations of the processing unit comprises utilization of sense information of the at least one sensor unit of the one or more unmanned aerial vehicle.

According to an example, a processing unit is configured to determine an instruction to the base station to enable one or more unmanned aerial vehicle to dock with the base station and wherein the processing unit is further configured to determine an instruction to the at least one service unit to clean, repair and/or exchange the at least one liquid application unit or a part of it, wherein the one or more unmanned aerial vehicle comprises at least one sensor unit configured to sense a clogging of the at least one liquid application unit, and wherein the determination of the processing unit comprises utilization of sense information of the at least one sensor unit of the one or more unmanned aerial vehicle.

In an example, the exchange of the at least one liquid application unit or part of it refers to the exchange of the at least one liquid application unit or part of it with an operable liquid application unit or part of it.

According to an example, a processing unit is configured to determine an instruction to the base station to enable one or more unmanned aerial vehicle to dock with the base station and wherein the processing unit is further configured to determine an instruction to the at least one service unit to recondition the at least one operating unit, wherein the one or more unmanned aerial vehicle comprises at least one sensor unit configured to sense the operability of the at least one operating unit, and wherein the determinations of the processing unit comprises utilization of sense information of the at least one sensor unit of the one or more unmanned aerial vehicle.

In an example of the invention, a base station comprises the processing unit and the processing unit is configured to carry out the analysis of the sense information received from the at least one sensor unit of the one or more unmanned aerial vehicle.

A further example refers to a base station, wherein a processing unit is configured to determine an instruction to the base station to enable one or more unmanned aerial vehicle to dock with the base station and wherein the processing unit is further configured to determine an instruction to the at least one service unit to recharge/refill the at least one power unit of the one or more unmanned aerial vehicle, wherein the one or more unmanned aerial vehicle comprises at least one sensor unit configured to sense the energy status of the at least one power unit and wherein the determinations of the processing unit comprises utilization of sense information of the at least one sensor unit of the one or more unmanned aerial vehicle.

According to an example, the base station comprises at least one sensor unit 190 configured to determine sense information comprising sensing one or more of: remaining airfield capacity for the one or more unmanned aerial vehicle intended to dock to the base station; inventory of liquid reservoir(s), liquid(s) with active ingredient(s), liquid application unit(s), operating unit(s) in stock on the base station and wherein the determinations of the processing unit comprises utilization of sense information of the at least one sensor unit of the one or more unmanned aerial vehicle and of the at least one sensor unit of the base station.

In another example, a sensor to sense the remaining airfield capacity for UAVs intended to dock to the base station can e.g. be a visual sensor such as a camera or a tactile sensor. The level of inventory can be sensed by reading smart tags on the products, store-shelf sensors, camera(s), RFID sensors etc. As concerns the inventory information of the base station it is also possible that a supplier, farmer, operator etc. is informed in order to ensure that the base station is restocked in due time.

In another example, the base station further comprises at least one sensor unit 190 configured to determine sense information comprising sensing one or more of: wind speed, wind direction, temperature, humidity, cloud movement, rainfall.

In another example, the processing unit analyses the sensor data of the at least one sensor unit of the base station to determine the optimum flight paths and times for an UAV while minimizing off target losses such as drift and therefore maximizing the application efficiency.

In another example, the processing unit analyses the sensor data of the at least one sensor unit of the base station to determine an instruction to the base station to move autonomously to another position (location).

In another example, the processing unit analyses the sensor data of the at least one sensor unit of the base station and the sense information of the at least one UAV to determine an instruction to the base station to move autonomously to another position (location).

In an example, the data communication between different components of the base station can occur via networks such as local area networks, wide area networks, internetworks or internet, using wireline or wireless links, including terrestrial or satellite links.

Figure 3:
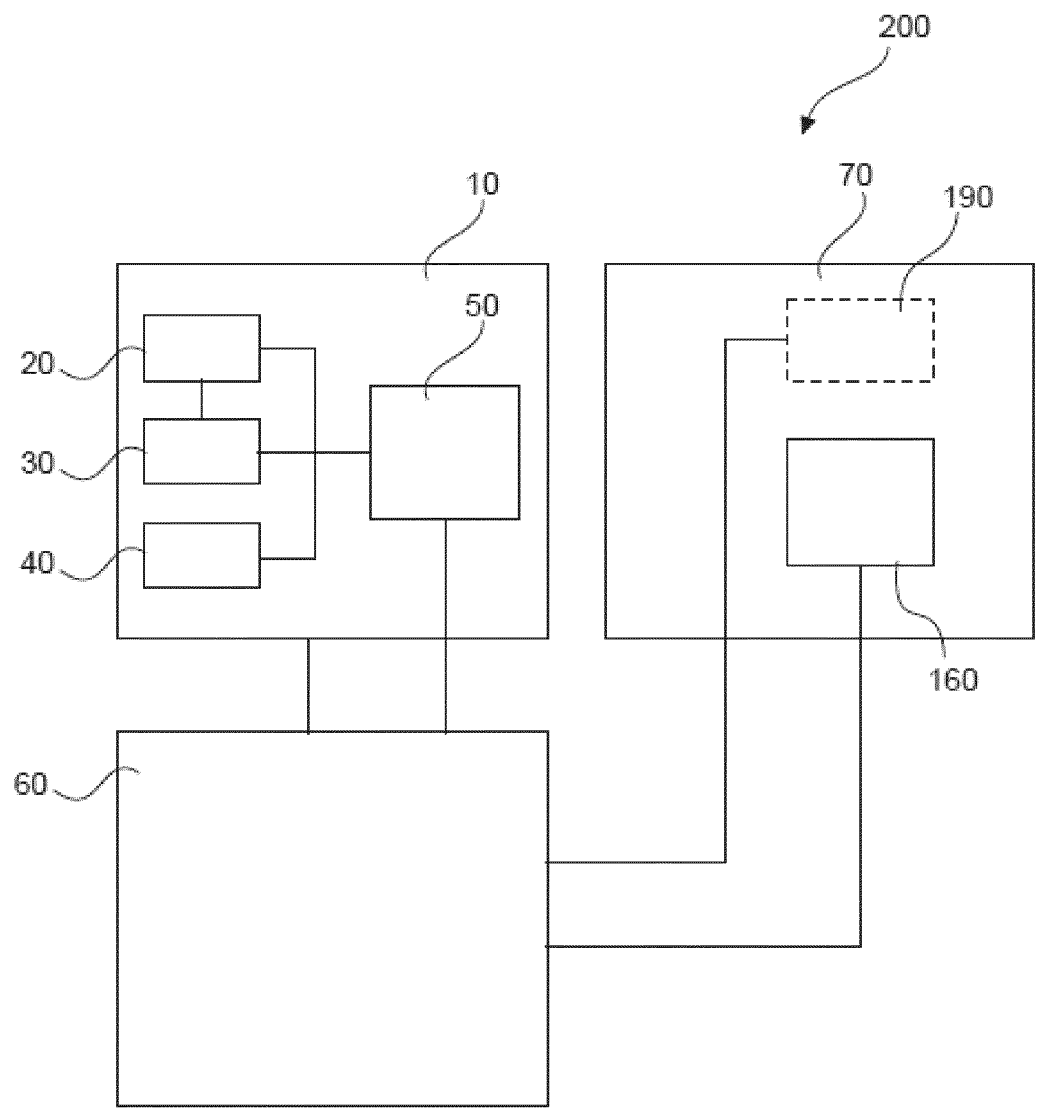
FIG. 3 shows a schematic set up for application of an active ingredient by an unmanned aerial vehicle to agricultural crops.

FIG. 3 shows a system 200 for application of an active ingredient to agricultural crops comprising at least one unmanned aerial vehicle 10 as described with respect to FIG. 1 and any of the associated examples; at least one base station 70 as described with respect to FIG. 2 and any of the associated examples and a processing unit 60. The at least one sensor unit 50 of the at least one unmanned aerial vehicle is configured to determine sense information comprising sensing a functioning of one or more of: the at least one liquid reservoir 20, the at least one liquid application unit 30, the at least one operating unit 40 and to relay the sense information to the processing unit. The processing unit is configured to determine an instruction for the at least one unmanned aerial vehicle to dock with the at least one base station. The processing unit is further configured to determine an instruction to the at least one base station to enable the at least one unmanned aerial vehicle to dock with the base station. The processing unit is further configured to determine an instruction to the at least one service unit 160 of the at least one base station to provide a service to the at least one unmanned aerial vehicle. All determinations of the processing unit comprises utilization of sense information of the at least one sensor unit of the at least one unmanned aerial vehicle.

In an example, the at least one sensor unit 50 of the at least one unmanned aerial vehicle is configured to determine sense information comprising sensing a functioning of: the at least one liquid reservoir 20, the at least one liquid application unit 30 and the at least one operating unit 40 and to relay the sense information to the processing unit.

In another example the system further comprises a base station with at least one sensor unit 190. In another example the at least one sensor unit of the at least one base station is configured to determine sense information comprising sensing one or more of: remaining airfield capacity for UAVs intended to dock to the base station; inventory of liquid reservoir(s), liquid(s) with active ingredient(s), liquid application unit(s), operating unit(s) in stock on the base station and wherein the sense information is forwarded to the processing unit.

In another example, the determinations of the processing unit comprises utilization of sense information of the at least one sensor unit of the at least one unmanned aerial vehicle and of the at least one sensor unit of the at least one base station.

In another example, there can be more than one processing unit(s).

In another example, the at least one UAV comprises a processing unit and the at least one base station comprises a processing unit. In this scenario, each processing unit has some common set of instructions or commands such that there are at least some (if not all) processes that can be executed on more than one processing units.

In an example, the data communication between different components of the system such as e.g. the camera(s) of the UAV, the at least one sensor unit of at least one UAV, the at least one sensor unit of the at least one base station, the processing unit(s), the at least one UAV, the at least one base station and/or the at least one service unit of the at least one base station can occur via networks such as local area networks, wide area networks, internetworks or internet, using wireline or wireless links, including terrestrial or satellite links.

Figure 4A:
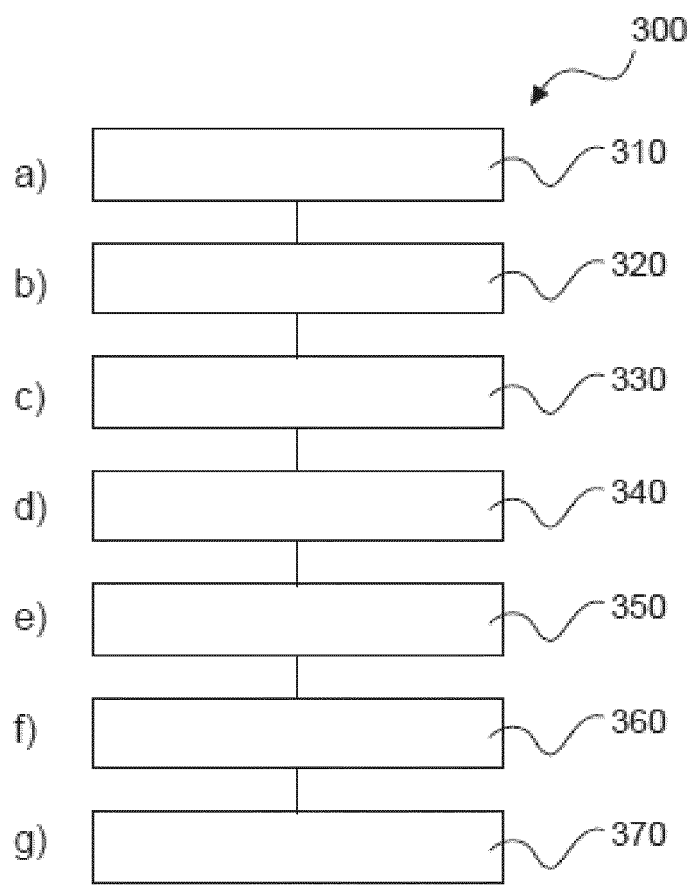
FIG. 4a shows a method for application of an active ingredient to agricultural crops with at least one unmanned aerial vehicle and at least one base station.

FIG. 4a shows a method 300 for application of an active ingredient to agricultural crops with at least one unmanned aerial vehicle and at least one base station in its basic steps. The method 300 comprises: a holding step 310, also referred to as step a), holding a liquid comprising an active ingredient in at least one liquid reservoir housed within or attached to the at least one unmanned aerial vehicle, wherein at least one liquid application unit is housed within or attached to the at least one unmanned aerial vehicle, and the at least one liquid application unit is in fluid communication with the at least one liquid reservoir;

- in a housing step 320, also referred to as step b), housing of at least one operating unit within or attached to the at least one unmanned aerial vehicle which is configured to enable the at least one unmanned aerial vehicle to fly;
- in a housing step 330, also referred to as step c), housing of a at least one sensor unit within or attached to the at least one unmanned aerial vehicle which is configured to determine sense information comprising sensing a functioning of one or more of: the at least one liquid reservoir, the at least one liquid application unit, the at least one operating unit;
- in a housing step 340, also referred to as step d), housing of a least one service unit within or attached to the at least one base station;
- in a sensing step 350, also referred to as step e), sensing a functioning of one or more of: the at least one liquid reservoir, the at least one liquid application unit, the at least one operating unit with the at least one sensor unit to provide sense information and relay it to the processing unit;
- in a docketing step 360, also referred to as step f), docketing the at least one unmanned aerial vehicle to the at least one base station if so instructed by the processing unit wherein the determination for the instruction comprises utilization of sense information; and
- in a servicing step 370, also referred to as step g), servicing the at least one unmanned aerial vehicle with the at least one service unit of the at least one base station if so instructed by the processing unit wherein the determination for the instruction comprises utilization of sense information.

In an example, in step c) housing of at least one sensor unit within or attached to the at least one unmanned aerial vehicle configured to sense the liquid level within the at least one liquid reservoir; in step f) docketing of the at least one unmanned aerial vehicle to the at least one base station; and in step g) refilling of the at least one liquid reservoir with liquid comprising an active ingredient and/or the exchanging of the at least one liquid reservoir if so instructed by the processing unit wherein the determination for the instruction comprises utilization of the sense information of the liquid level within the at least one liquid reservoir.

In an example, in step c) housing of at least one sensor unit within or attached to the at least one unmanned aerial vehicle configured to sense the operability of the at least one liquid application unit; in step f) docketing of the at least one unmanned aerial vehicle to the at least one base station; and in step g) cleaning, repairing and/or exchanging the at least one liquid application unit or a part of it if so instructed by the processing unit wherein the determination for the instruction comprises utilization of the sense information of the operability of the at least one liquid application unit.

In an example, in step c) housing of at least one sensor unit within or attached to the at least one unmanned aerial vehicle configured to sense the operability of the at least one operation unit; in step f) docketing of the at least one unmanned aerial vehicle to the at least one base station and in step g) reconditioning of the at least one operating unit if so instructed by the processing unit wherein the determination for the instruction comprises utilization of the sense information of the operability of the at least one operating unit.

In an example, in step e), sensing a functioning of: the at least one liquid reservoir, the at least one liquid application unit and the at least one operating unit with the at least one sensor unit to provide sense information and relay it to the processing unit.

In an example, in step b), the at least one operating unit comprises one or more of: a power unit, a flight controlling unit, a propeller engine unit, a propeller blade unit and a frame.

In an example, in step d), the at least one base station comprises at least one sensor unit configured to determine sense information comprising sensing one or more of: remaining airfield capacity for one or more unmanned aerial vehicle intended to dock to the base station; inventory of liquid reservoir(s), liquid(s) with active ingredient(s), liquid application unit(s), operating unit(s) in stock on the base station, and in step f) docketing of the at least one unmanned aerial vehicle to the at least one base station and in step g) servicing of the at least one unmanned aerial vehicle with the at least one service unit of the at least one base station if so instructed by the processing unit wherein the determination for the instruction comprises utilization of sense information of the of the at least one sensor unit of the one or more unmanned aerial vehicle and of the at least one sensor unit of the one or more base station.

Figure 4B:
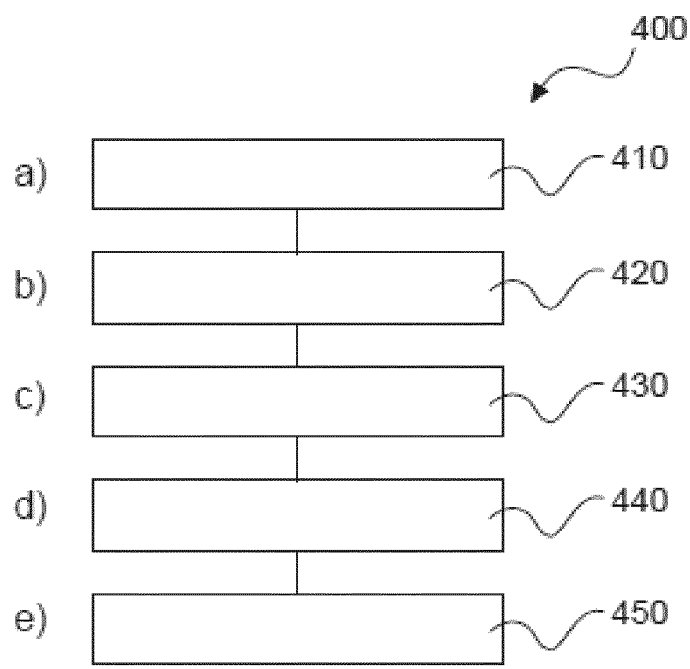
FIG. 4b shows a method for application of an active ingredient to agricultural crops by an unmanned aerial vehicle.

FIG. 4b shows a method 400 for application of an active ingredient to agricultural crops by an unmanned aerial vehicle in its basic steps. The method 400 comprises: a holding step 410, also referred to as step a), holding a liquid comprising an active ingredient in at least one liquid reservoir housed within or attached to the unmanned aerial vehicle, wherein at least one liquid application unit is housed within or attached to the unmanned aerial vehicle and the at least one liquid application unit is in fluid communication with the at least one liquid reservoir;

- in a housing step 420, also referred to as step b), housing of at least one operating unit within or attached to the unmanned aerial vehicle which is configured to enable the unmanned aerial vehicle to fly;
- in a housing step 430, also referred to as step c), housing of at least one sensor unit within or attached to the unmanned aerial vehicle which is configured to determine sense information comprising sensing a functioning of one or more of: the at least one liquid reservoir, the at least one liquid application unit, the at least one operating unit;
- in a sensing step 440, also referred to as step d), sensing a functioning of one or more: the at least one liquid reservoir, the at least one liquid application unit, the at least one operating unit; with the at least one sensor unit to provide sense information and relay it to the processing unit; and in a determining step 450, also referred to as step e), determining an instruction to the unmanned aerial vehicle to dock with a base station and get a service from the base station by the processing unit, wherein the determining step comprises utilization of the sense information.

In an example, in step c) housing of at least one sensor unit within or attached to the unmanned aerial vehicle configured to sense the liquid level within the at least one liquid reservoir; in step d) sensing the liquid level within the at least one liquid reservoir with the at least one sensor unit to provide sense information and relay it to the processing unit; and in step e) determining an instruction to the unmanned aerial vehicle to dock with a base station and to refill the at least one liquid reservoir with liquid comprising an active ingredient and/or the exchange the at least one liquid reservoir by the processing unit, wherein the determining step comprises utilization of the sense information of the liquid level within the at least one liquid reservoir.

In an example, in step c) housing of at least one sensor unit within or attached to the unmanned aerial vehicle configured to sense the operability of the at least one application unit; in step d) sensing the operability of the at least one liquid application unit to provide sense information and relay it to the processing unit; and in step e) determining an instruction to the unmanned aerial vehicle to dock with a base station and to clean, repair and/or exchange the at least one liquid application unit or a part of it by the processing unit, wherein the determining step comprises utilization of the sense information of the operability of the at least one liquid application unit.

In an example, in step c) housing of at least one sensor unit within or attached to the unmanned aerial vehicle configured to sense the operability of the at least one operating unit; in step d) sensing the operability of the at least one operating unit to provide sense information and relay it to the processing unit; and in step e) determining an instruction to the unmanned aerial vehicle to dock with a base station by the processing unit and to recondition the at least one operating unit, wherein the determining step comprises utilization of the sense information of the operability of the at least one operating unit.

In an example, in step d), sensing a functioning of: the at least one liquid reservoir, the at least one liquid application unit and the at least one operating unit with the at least one sensor unit to provide sense information and relay it to the processing unit.

In an example, in step b), the at least one operating unit comprises one or more of: a power unit, a flight controlling unit, a propeller engine unit, a propeller blade unit and a frame.

Figure 4C:
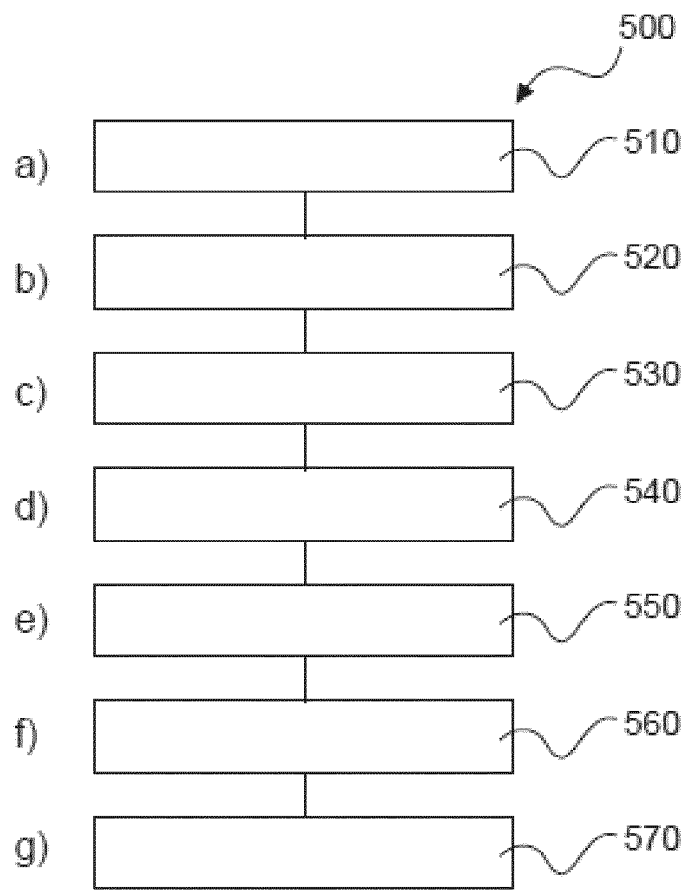
FIG. 4c shows a method for servicing an unmanned aerial vehicle with a base station.

FIG. 4c shows a method 500 for servicing an unmanned aerial vehicle with a base station in its basic steps. The method 500 comprises: a holding step 510, also referred to as step a), holding of at least one service unit within or attached to a base station;

in a holding step 520, also referred to as step b), holding a liquid comprising an active ingredient in at least one liquid reservoir housed within or attached to the unmanned aerial vehicle, wherein at least one liquid application unit is housed within or attached to the unmanned aerial vehicle, and the at least one liquid application unit is in fluid communication with the at least one liquid reservoir;

in a housing step 530, also referred to as step c), housing of at least one operating unit within or attached to the unmanned aerial vehicle which is configured to enable the unmanned aerial vehicle to fly;

in a housing step 540, also referred to as step d), housing of at least one sensor unit within or attached to the unmanned aerial vehicle which is configured to determine sense information comprising sensing a functioning of one or more of: the at least one liquid reservoir, the at least one liquid application unit, the at least one operating unit;

in a sensing step 550, also referred to as step e), sensing a functioning of one or more: the at least one liquid reservoir, the at least one liquid application unit, the at least one operating unit; with the at least one sensor unit to provide sense information and relay it to the processing unit;

in a determination step 560, also referred to as step f), determining an instruction to the base station to enable an unmanned aerial vehicle to dock with the base station by the processing unit, wherein the determining step comprises utilization of the sense information; and in a determining step 570, also referred to as step g), determining an instruction to the at least one service unit within or attached to the base station to provide a service to the unmanned aerial vehicle by the processing unit, wherein the determining step comprises utilization of the sense information.

In an example in step d) housing of at least one sensor unit within or attached to the unmanned aerial vehicle which is configured to sense the liquid level within the at least one liquid reservoir, and in step e) sensing the liquid level within the at least one liquid reservoir, and in step f) determining an instruction to the base station to enable an unmanned aerial vehicle to dock with the base station by the processing unit, wherein the determining step comprises utilization of the sense information; and in step g) determining an instruction to the at least one service unit within or attached to the base station by the processing unit to refill at least one liquid reservoir of the one or more unmanned aerial vehicle with liquid comprising an active ingredient and/or to exchange the at least one liquid reservoir of the one or more unmanned aerial vehicle with an at least partially filled (typically a full) liquid reservoir with liquid comprising an active ingredient, wherein the determining step comprises utilization of the sense information;

In an example in step d) housing of at least one sensor unit within or attached to the unmanned aerial vehicle which is configured to sense the operability of the at least one liquid application unit, and in step e) sensing the operability of the at least one liquid application unit, and in step f) determining an instruction to the base station by the processing unit to enable an unmanned aerial vehicle to dock with the base station, wherein the determining step comprises utilization of the sense information; and in step g) determining an instruction to the at least one service unit within or attached to the base station by the processing unit to clean, repair and/or exchange the at least one liquid application unit or a part of it, wherein the determining step comprises utilization of the sense information;

In an example in step d) housing of at least one sensor unit within or attached to the unmanned aerial vehicle which is configured to sense the operability of the at least one operation unit, and in step e) sensing the operability of the at least one operation unit, and in step f) determining an instruction to the base station by the processing unit to enable an unmanned aerial vehicle to dock with the base station, wherein the determining step comprises utilization of the sense information; and in step g) determining an instruction to the at least one service unit within or attached to the base station by the processing unit to recondition the at least one operating unit, wherein the determining step comprises utilization of the sense information;

In an example, in step e) sensing a functioning of: the at least one liquid reservoir, the at least one liquid application unit and the at least one operating unit with the at least one sensor unit to provide sense information and relay it to the processing unit.

Figure 5A:
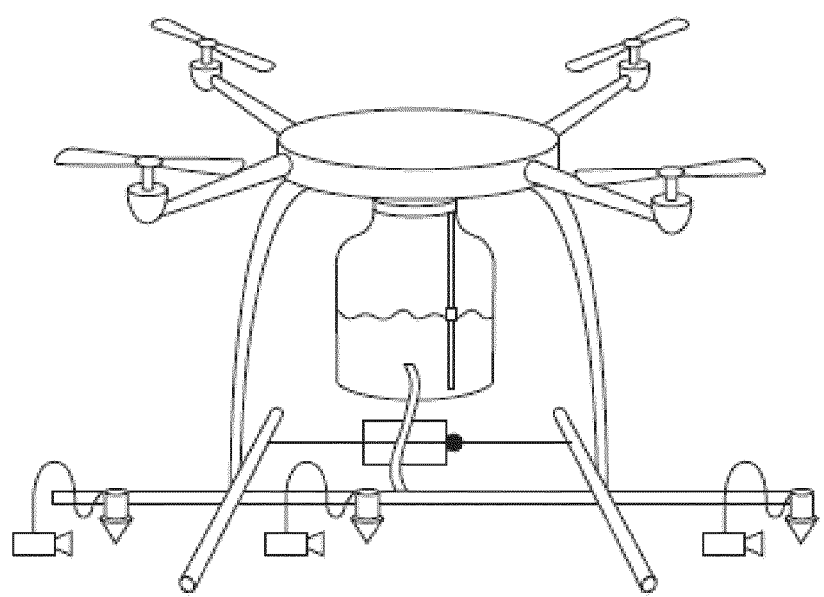
FIG. 5a shows a detailed example of the unmanned aerial vehicle of FIG. 1.
Figure 5B:
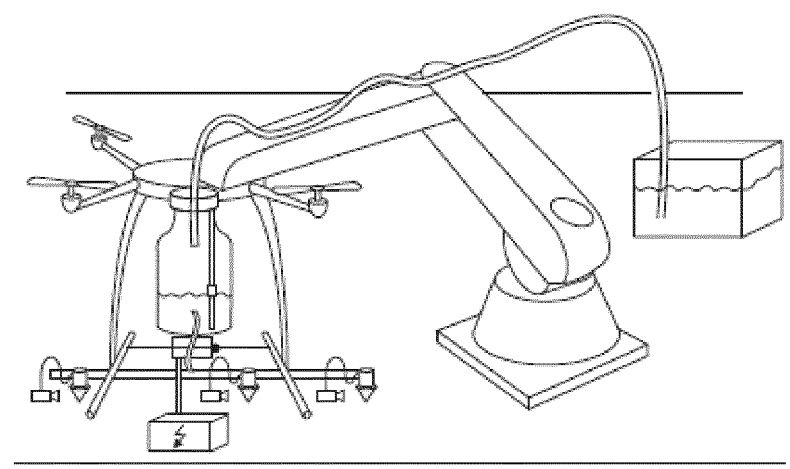
FIG. 5b shows a detailed example of the base station of FIG. 2 and an unmanned aerial vehicle of FIG. 1.
Figure 6:
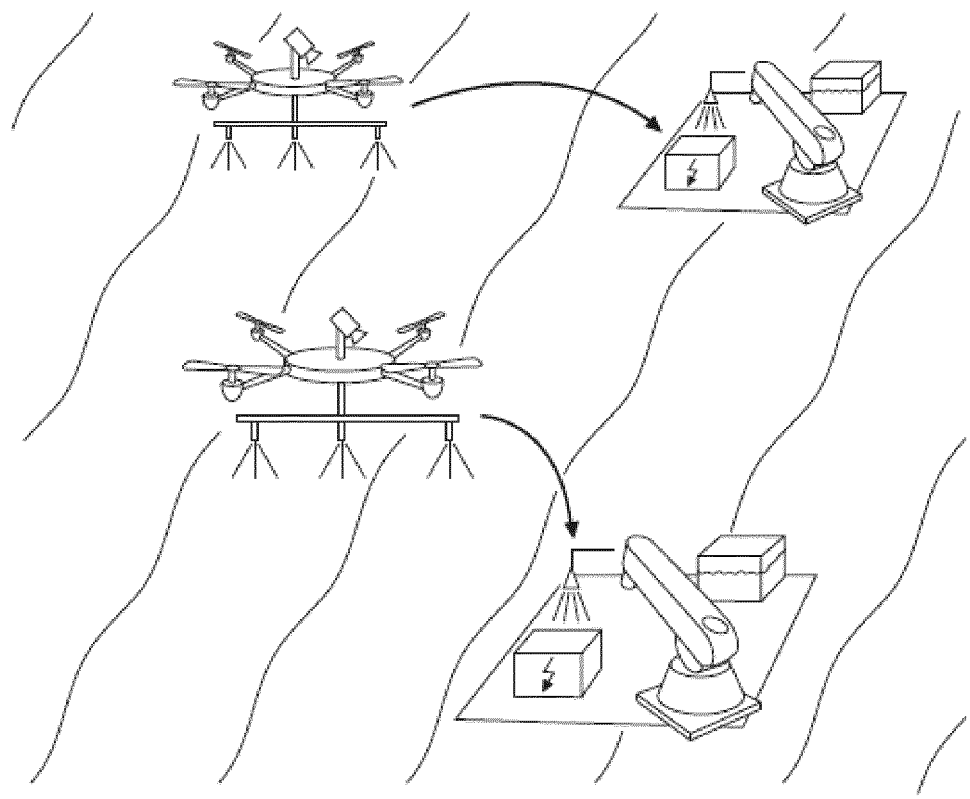
FIG. 6 shows a detailed example of a of the schematic set up for application of an active ingredient to agricultural crops of FIG. 3 and includes multiple unmanned aerial vehicle and base stations.

In an example, in step a) housing of at least one sensor unit within or attached to the base station which is configured to determine sense information comprising sensing one or more of: remaining airfield capacity for one or more unmanned aerial vehicle intended to dock to the base station; inventory of liquid reservoir(s), liquid(s) with active ingredient(s), liquid application unit(s), operating unit(s) in stock on the base station, in step e) sensing one or more of: remaining airfield capacity for one or more unmanned aerial vehicle intended to dock to the base station; inventory of liquid reservoir(s), liquid(s) with active ingredient(s), liquid application unit(s), operating unit(s) in stock on the base station, and in step f) determining an instruction to the base station by the processing unit to enable an unmanned aerial vehicle to dock with the base station, wherein the determining step comprises utilization of the sense information; and in step g) determining an instruction to the at least one service unit within or attached to the base station by the processing unit to get the a service by the at least one service unit, wherein the determining step comprises utilization of the sense information;

The unmanned aerial vehicle for application of an active ingredient to agricultural crops, the base station, system for application of an active ingredient to agricultural crops, and method for application of an active ingredient by an unmanned aerial vehicle to agricultural crops are described in with respect to a very detailed embodiments as shown in FIGS. 5 and 6.

In FIG. 5*a*, a drone with liquid reservoir is shown. The drone has a sensor to measure the liquid level in the liquid reservoir and the liquid reservoir has a fluid connection to a liquid application unit (spraying lance). The spraying lance does have three nozzles. The rectangle beneath the liquid reservoir indicates a power unit such as a battery. The circle to the right of the rectangle indicates a sensor which measures the charge of the battery. In addition, cameras at the nozzles of the spraying lance sense the spraying pattern of the system and provide an indication about the operability of the nozzles. The sense information of the liquid level, the charge of the battery as well as the operability of the nozzles is transmitted to a processing unit which is not shown on the picture. The processing unit is configured to determine an instruction for the unmanned aerial vehicle to dock with a base station and get a service from the base station when either the charge of the battery is low, the liquid level within the liquid reservoir is low and/or the nozzles are blocked or clogged.

FIG. 5*b* shows a drone docked to a base station. The figure shows recharging of the battery and refilling of the liquid reservoir with liquid comprising an active ingredient. In order to achieve efficacy it is intended that both services are done at the same time even though e.g. the battery might still have energy or the liquid reservoir does still comprise a lot of liquid with active ingredient. As shown a robot arm supports the refilling and establishes a fluid connection between a liquid reservoir on the base station and the liquid reservoir to be filled on the drone. At the same time the battery—as shown as a rectangle below the liquid reservoir of the drone—is connected to a battery charger as part of the base station. Connection is also made autonomously between the battery and the battery charger e.g. as part of the docketing process of the drone to the base station.

FIG. 6 shows two drones and two base stations. The drones do have a liquid reservoir and liquid application unit (spraying lance with three nozzles) in fluid connection. The spraying lance is spraying liquid with active ingredient to the crop field. The drones are heading to the closest base station in order to get a service when their liquid level sensor indicates a low level of remaining liquid within the reservoir, in case the charge of the battery of the drone gets low and/or e.g. when one of the nozzle of the spraying lance clogs. The base stations do have a service unit which comprises a robot arm (on the bottom right of the rectangle), a battery charger (bottom left of the rectangle), a liquid reservoir to refill the liquid reservoir(s) of the drone(s) (at the top on the right side of the rectangle) and nozzle which can be screwed into the spraying lance (as depicted on the top on the left side of the rectangle). The robot arm supports the service to get the liquid reservoirs refilled with liquid, to get the battery recharged and/or to unscrew the clogged nozzle(s) from the spraying lance and to screw new respectively cleaned nozzles into the spraying lance. Furthermore, the drones have a camera to transmit image information to the processing unit (not shown) while the processing unit makes an image analysis in order to manage the spraying and flying activity of the drone.

In another exemplary embodiment, a computer program or computer program element is provided that is characterized by being configured to execute the method steps of the method according to one of the preceding embodiments, on an appropriate system.

The computer program element might therefore be stored on a computer unit, which might also be part of an embodiment. This computing unit may be configured to perform or induce performing of the steps of the method described above. Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses invention.

Further on, the computer program element might be able to provide all necessary steps to fulfill the procedure of an exemplary embodiment of the method as described above.

According to a further exemplary embodiment of the present invention, a computer readable medium, such as a CD-ROM, USB stick or the like, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application.

While examples of the invention have been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An unmanned aerial vehicle for application of an active ingredient to agricultural crops, comprising:
   at least one liquid reservoir,
   at least one liquid application unit,
   at least one operating unit,
   at least one sensor unit,
   wherein the at least one liquid reservoir is configured to hold a liquid comprising an active ingredient;
   wherein the at least one liquid application unit is in fluid communication with the at least one liquid reservoir;
   wherein the at least one operating unit is configured to enable the unmanned aerial vehicle to fly;
   wherein the at least one sensor unit is configured to determine sense information comprising sensing a functioning of the at least one liquid application unit; and
   wherein a processing unit is configured to determine an instruction for the unmanned aerial vehicle to dock with a base station and to clean, repair, and/or exchange the at least one liquid application unit or a part of the at least one liquid application unit, wherein the determination comprises utilization of the sense information of the functioning of the at least one liquid application unit.

2. The unmanned aerial vehicle of claim 1, wherein:
   the at least one sensor unit is further configured to determine sense information comprising sensing a functioning of the at least one liquid reservoir; and
   the processing unit is configured to determine an instruction for the unmanned aerial vehicle to dock with a base station and to refill the at least one liquid reservoir with liquid comprising an active ingredient and/or to exchange the at least one liquid reservoir with an at least partially filled liquid reservoir with liquid comprising an active ingredient, wherein the determination comprises utilization of the sense information of the functioning of the at least one liquid reservoir.

3. The unmanned aerial vehicle of claim 1, wherein:
   the at least one sensor unit is further configured to determine sense information comprising sensing a functioning of the at least one operating unit; and
   the processing unit is configured to determine an instruction for the unmanned aerial vehicle to dock with a base station and to recondition the at least one operating unit, wherein the determination comprises utilization of the sense information of the functioning of the at least one operating unit.

4. The unmanned aerial vehicle of claim 1, wherein the at least one operating unit comprises one or more of: a power unit, a flight controlling unit, a propeller engine unit, a propeller blade unit and a frame.

5. The unmanned aerial vehicle of claim 1, wherein the at least one sensor unit is configured to determine sense information comprising sensing a clogging of the at least one liquid application unit.

6. The unmanned aerial vehicle of claim 5, wherein the at least one sensor unit for the at least one liquid application unit senses the clogging via measurement of a change in a pressure of the liquid to be sprayed through the at least one liquid application unit to the plants.

7. The unmanned aerial vehicle of claim 5, wherein the at least one sensor unit for the at least one liquid application unit senses the clogging via a measurement of a change in a spraying pattern of the at least one liquid application unit.

* * * * *